(12) United States Patent
Vernooy et al.

(10) Patent No.: US 8,199,334 B2
(45) Date of Patent: Jun. 12, 2012

(54) SELF-CALIBRATED INTERROGATION SYSTEM FOR OPTICAL SENSORS

(75) Inventors: David William Vernooy, Niskayuna, NY (US); Glen Peter Koste, Niskayuna, NY (US); Aaron Jay Knobloch, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 495 days.

(21) Appl. No.: 12/413,812

(22) Filed: Mar. 30, 2009

(65) Prior Publication Data
US 2010/0245840 A1    Sep. 30, 2010

(51) Int. Cl.
*G01B 9/02* (2006.01)
(52) U.S. Cl. ........................................................ 356/519
(58) Field of Classification Search .................. 356/519
See application file for complete search history.

(56) References Cited

U.S. PATENT DOCUMENTS

| | | | |
|---|---|---|---|
| 4,703,175 A | 10/1987 | Salour et al. | |
| 4,712,004 A | 12/1987 | Spillman, Jr. | |
| 5,606,170 A | 2/1997 | Saaski et al. | |
| 5,742,200 A | 4/1998 | He | |
| 5,929,990 A | 7/1999 | Hall | |
| 6,612,174 B2 | 9/2003 | Sittler et al. | |
| 6,792,023 B1 * | 9/2004 | Kleinschmidt et al. | 372/57 |
| 7,016,047 B2 * | 3/2006 | May | 356/480 |
| 7,054,011 B2 | 5/2006 | Zhu et al. | |
| 7,173,713 B2 | 2/2007 | Xu et al. | |
| 7,308,162 B2 | 12/2007 | Wang | |
| 7,355,684 B2 | 4/2008 | Jeffers et al. | |
| 2006/0283255 A1 | 12/2006 | Tilak et al. | |
| 2007/0013914 A1 | 1/2007 | May et al. | |
| 2008/0106745 A1 | 5/2008 | Haber et al. | |

OTHER PUBLICATIONS

Wang et al.; "Self-Calibrated Interferometric-Intensity-Based Optical Fiber Sensors"; Journal of Lightwave Technology, vol. 19, No. 10, Oct. 2001; pp. 1495-1501.

Kristie Cooper, Gary Pickrell and Anbo Wang; "Optical Fiber Sensor Technologies for Efficient and Economical Oil Recovery"; Technical Progress Report; Center for Photonics Technology; Apr. 2003; DOE Award No. DE-FG26988C15167; Downloaded from internet: <http://www.osti.gov/bridge/servlets/purl/820020-iUmlhV/native/820020.pdf>; 46 Pages, 2003.

"Chapter 2. Self-Calibrated Interferometric/Intensity Based (SCIIB) Sensor Technology"; Downloaded from Internet: <http://scholar.lib.vt.edu/theses/available/etd-12132000-162210/unrestricted/chapter2-principle.pdf>; 25 Pages, 2000.

* cited by examiner

*Primary Examiner* — Tarifur Chowdhury
*Assistant Examiner* — Abdullahi Nur
(74) *Attorney, Agent, or Firm* — Scott J. Asmus

(57) ABSTRACT

An optical pressure sensor interrogation system is provided. The system includes a light source for providing an optical signal to an optical pressure sensor and an optical coupler for receiving a reflected signal from the optical pressure sensor. The optical coupler splits the reflected signal and provides a first portion of the reflected signal to a first optical detector. The system further includes a filter for receiving a second portion of the reflected signal and providing a filtered signal to a second optical detector and a processing circuitry configured to obtain pressure based on a division or a subtraction of light intensities of the first and the second optical detector output signals. The processing circuitry is further configured to provide a feedback signal to the light source to control a wavelength of the optical signal.

19 Claims, 12 Drawing Sheets

SELF-CALIBRATED INTERROGATION SYSTEM FOR OPTICAL SENSORS

BACKGROUND

The present description relates generally to optical sensors, and more particularly to interrogation methods of Fabry-Perot based optical pressure sensors for measuring static and dynamic pressures over a wide bandwidth range at high temperatures.

Pressure sensors are used in a wide range of industrial and consumer applications. Pressures of many different magnitudes may be measured using various types of pressure sensors, such as Bourdon-tube type pressure sensors, diaphragm-based pressure sensors and piezoresistive pressure sensors on silicon or silicon on insulator (SOI). Several variations of the diaphragm-based pressure sensor have been utilized to measure different ranges of pressure, such as by utilizing cantilever-based pressure sensors, optically read pressure sensors and the like.

Fiber optic sensor utilizing a Fabry-Perot cavity have been demonstrated to be attractive for the measurement of temperature, strain, pressure and displacement, due to their high sensitivity. Some advantages of fiber optic sensors over conventional electrical sensors include immunity to electromagnetic interference (EMI), resistance to harsh environments, small form factor and potential for multiplexing.

In some instances the Fabry-Perot cavity is formed by a diaphragm, which deflects under pressure. The cavity is illuminated with a visible or infrared light source and a varying amount of that light is both reflected by and transmitted through diaphragm. When the light reflects back toward the source, there is constructive and/or destructive inteference of the light with the incident beam characteristic of the length of the Fabry-Perot cavity. When the diaphragm is deflected as a result of quantity to be measured such as applied pressure, force, stress or strain (herein referred to as the measurand), the interference behavior changes due to the change in the length of the Fabry-Perot cavity.

The main challenges in converting diaphragm deflection into a usable linear output include maintaining adequate optical signal levels to overcome noise in the receiver while attempting to make the system immune to any fluctuations other than those of the sensor itself. Typical fluctuations might include intensity fluctuations of the interrogating optical source, mechanical fluctuations within the optical path, and temperature-induced fluctuations in the system.

BRIEF DESCRIPTION

In accordance with one exemplary embodiment of the present invention, an optical pressure sensor interrogation system is provided. The system includes a light source for providing an optical signal to an optical pressure sensor and an optical coupler for receiving a reflected signal from the optical pressure sensor. The optical coupler further splits the reflected signal and provides a first portion of the reflected signal to a first optical detector. The system further includes a filter for receiving a second portion of the reflected signal and providing a filtered signal to a second optical detector and a processing circuitry configured to obtain pressure based on a division or a subtraction of light intensities of the first and the second optical detector output signals. The processing circuitry is further configured to provide a feedback signal to the light source to control a wavelength of the optical signal.

In accordance with another exemplary embodiment of the present invention, another optical pressure sensor interrogation system is provided. The system includes a light source for providing an optical signal to an optical pressure sensor and an optical coupler for receiving a reflected signal from the optical pressure sensor. The optical coupler further splits the reflected signal and provides a first portion of the reflected signal to a high pass filter and provides a second portion of the reflected signal to a low pass filter. The system further includes a first optical detector for receiving a first filtered signal from the high pass filter and providing a filtered signal to a second optical detector, a second optical detector for receiving a second filtered signal from the low pass filter and a processing circuitry configured to obtain pressure based on a relationship between light intensities of the first and the second optical detector output signals.

In accordance with one exemplary embodiment of the present invention, an optical pressure sensor interrogation system is provided. The system includes a light source for providing an optical signal to an optical pressure sensor and a three port filter for receiving a reflected signal from the optical pressure sensor. The optical coupler further splits the reflected signal and provides a low pass filtered signal of the reflected signal to a first optical detector. The system further includes a second optical detector for receiving a high pass filtered signal of the reflected signal from the three port filter and a processing circuitry configured to obtain pressure based on a relationship between light intensities of the first and the second optical detector output signals.

In accordance with another exemplary embodiment of the present invention, an optical pressure sensor interrogation system is provided. The system includes a first light source and a second light source for providing a first optical signal and a second optical signal and a first optical coupler for receiving the first and the second optical signals and providing a coupled signal to the optical pressure sensor. The system further includes a second optical coupler for receiving a reflected signal from the optical pressure sensor, splitting the reflected signal and providing a first portion of the reflected signal to a first optical detector and a second portion of the reflected signal to a second optical detector. The system also includes a processing circuitry configured to obtain pressure based on a relationship between light intensities of the first and the second optical detector output signals. The processing circuitry is further configured to provide a feedback signal to the first and the second light sources to control a wavelength of the first and the second optical signals.

In accordance with yet another exemplary embodiment of the present invention, a method of interrogating an optical pressure sensor is provided. The method includes providing an optical signal to the optical pressure sensor and splitting a reflected signal from the optical pressure sensor into a first signal and a second signal. The method further includes analyzing a filtered first signal and the second signal to obtain pressure based on subtraction of light intensities of the first and the second optical detector output signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail herein, embodiments of the invention include interrogation methods for a high temperature optical sensor based on extrinsic Fabry-Perot interferometer (EFPI) principle.

In one embodiment, an approach to dealing with this is to use differential techniques to subtract out common-mode system noise. With the availability of low cost optical sources such as LEDS and components such as thin film filters, differential techniques in the frequency (or wavelength) domain are particularly attractive. In this domain, movements of the membrane cause the sensor to act like a variable optical filter, whose wavelength response varies with pressure. Suitable low cost interrogator architectures can convert this response to a linear amplitude response.

Figure 1:
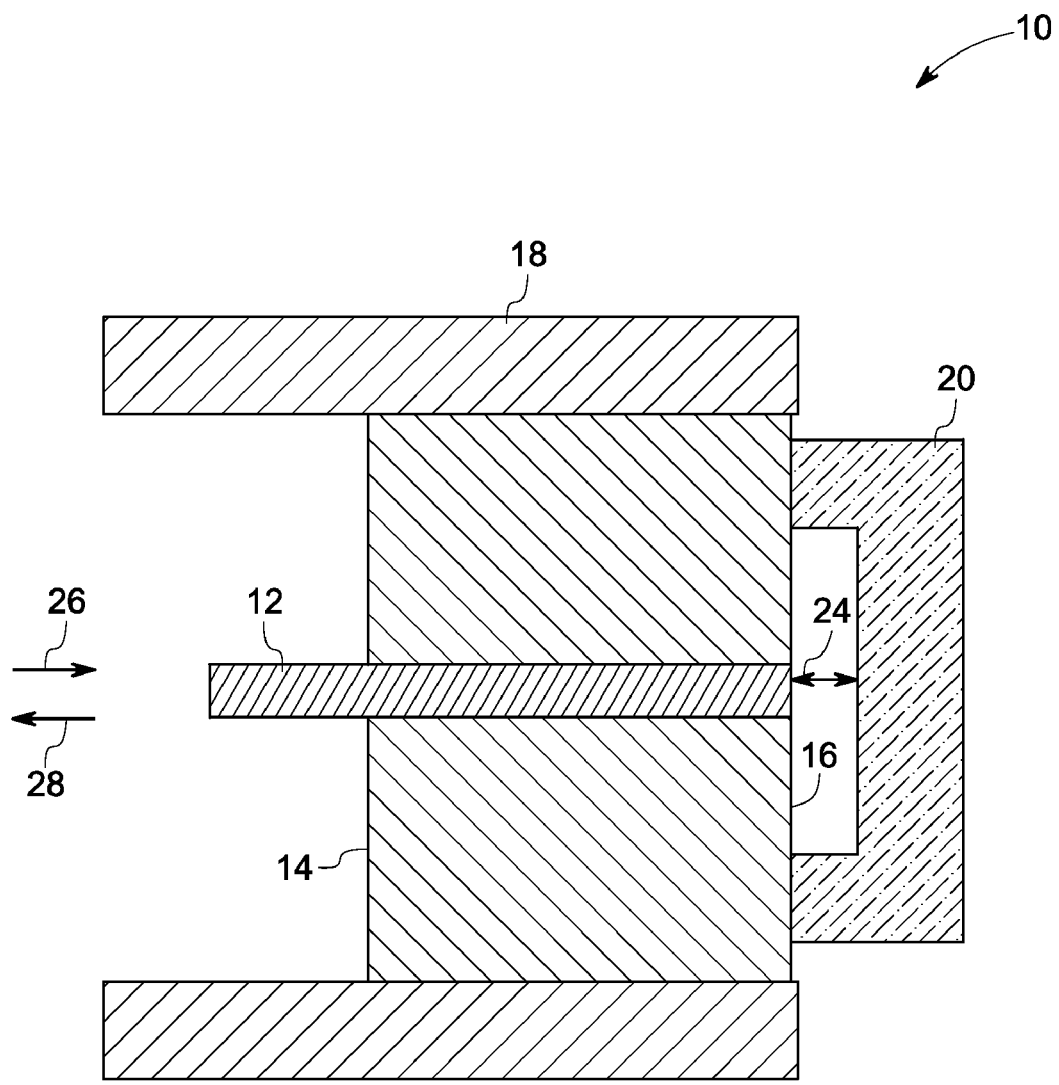
FIG. 1 is a diagrammatical representation of an extrinsic Fabry-Perot interferometer based pressure sensor system, in accordance with an embodiment of the present invention.

FIG. 1 is a perspective view of an EFPI based pressure sensor 10. An optical fiber 12 is fixed inside a ferrule 14. One side 16 of the optical fiber-ferrule structure is polished using standard fiber polishing processes. The polishing ensures a planar surface for mounting a substrate 20. An outer metal casing 18 encloses the optical fiber-ferrule structure. The substrate 20 acting as a diaphragm is attached to the surface 16 of the optical fiber-ferrule structure through a vacuum bonding process to trap a vacuum in the cavity gap. In one embodiment, the vacuum bonding process includes laser melting process or surface activation bonding process. In one embodiment, the material used for the substrate 20 comprises silicon, glass, quartz, or sapphire. A Fabry-Perot cavity 24 is defined in the substrate 20, which also defines the diaphragm outer diameter. In one embodiment, the inner surface of the substrate 20 which defines one half of the Fabry-Perot cavity may be coated with a reflective thin metal film (not shown). In one embodiment, the material used for metal film comprises platinum, gold, titanium, chrome, silver or any other high temperature compatible metal.

An incident light signal 26 is passed through the fiber 12 and is communicated through cavity gap 24 to the substrate 20. In one embodiment, a light emitting diode (LED) may generate the light signal. The light signal 26 is reflected by the substrate 20 and back into the fiber 12 as a reflected signal 28. The travel of the light is depicted by the directional arrows in FIG. 1. The reflected light is detected by an optical detector (not shown) where the signal is demodulated to produce a distance measurement of the cavity gap 24. As the cavity gap 24 changes due to a pressure applied on the diaphragm, the demodulated signal of that distance determines the pressure.

Figure 2:
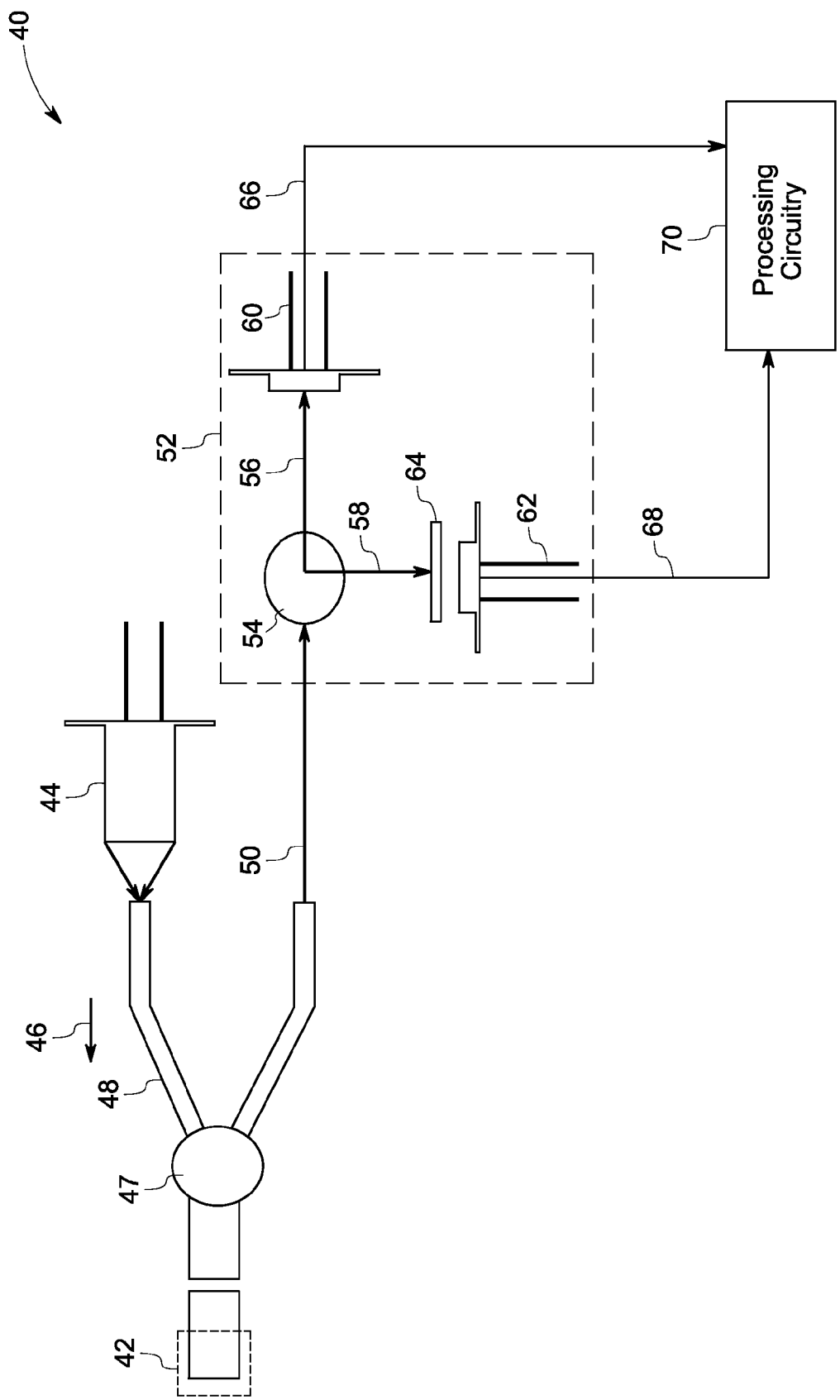
FIG. 2 is a diagrammatical representation of an interrogation system of a pressure sensor, in accordance with an embodiment of the present invention.

FIG. 2 is diagrammatical representation of an entire interrogation system 40 of a pressure sensor 42 such as the pressure sensor depicted in FIG. 1. A light emitting diode (LED) 44 generates a light signal 46 and an optical fiber 48 transmits the light signal 46 to the optical coupler 47. The optical coupler 47 transmits the beam to the sensor 42. In one embodiment, the LED is of a central wavelength of 1550 nm. The reflected signal 50 from the optical pressure sensor 42 passes back through the optical coupler 47, which splits the signal to an optical interrogator detector system 52. The detector circuit 52 includes an optical coupler 54 that splits the reflected signal 50 into two equal signals; a first signal 56 and a second signal 58. The first signal 56 passes directly to a first optical detector 60 that detects the broadband signal. The second signal 58 passes through a narrow band filter 64 to a second optical detector 62, which detects the narrow band signal. In one embodiment, the optical detectors 62 and 60 are photodiodes. Output signals 66 and 68 of the optical detectors 60 and 62 are then analyzed by a processing circuitry 70 to output a pressure signal. The processing circuitry 64 may include a processor, memory, and associated circuitry, e.g., a computer system.

Assuming the sensor 42 is comprised of a stack of three materials, the reflectance as a function of wavelength $\lambda$ from the sensor 42 is given as:

$$R(\phi) = \left| \frac{r_{12} + r_{23}e^{j\phi}}{1 + r_{12}r_{23}e^{j\phi}} \right|^2 \quad (1)$$

where $$\phi = \frac{4\pi n_2 d}{\lambda}$$

is the phase difference for the normal incidence, $r_{12}$ is the reflection coefficient for normal incidence at the interface between materials 1 and 2 and $r_{23}$ is the reflection coefficient for normal incidence at the interface between materials 2 and 3. In addition, $\lambda$ is the wavelength of the light source and $n_2$ is the refractive index of material 2. In one particular embodiment, the material 2 may be air, and comprises a "gap" of distance d between materials 1 and 3. The reflection function depends on d and may display fringes (peaks and valleys in response). The spacing between peaks in the response appear as the gap d is changed by a distance corresponding to $\lambda/2$.

In one embodiment, where the optical source is not at a discrete wavelength (such as a laser), but comprises a continuum of wavelengths (such as an LED or SLED), the output optical intensity I from the sensor 42 is given by:

$$I = \int R(\lambda).G(\lambda)f(\lambda)d\lambda \quad (5)$$

where, $G(\lambda)$ is the spectral power density distribution of the light source and $f(\lambda)$ is the response of in-line filters in the receiver. In a case where there is no filter used along with the light detector, the first signal 56 is a "broadband" signal and $f(\lambda)=1$. On the other hand, where the spectral filter 64 is used to narrow the wavelength response of the light detector 62 and thus the second signal 58 is a "narrowband" signal. In the above equation, the spectral power density distribution $G(\lambda)$ is approximately given by:

$$G(\lambda) = e^{\left(-\frac{\lambda-\lambda_0}{\Delta\lambda}\right)^2} \quad (6)$$

where $\lambda_0$ is the center wavelength of the LED. In the case of broadband interrogation, the fringe structure in the response may tend to disappear, or "wash out" as the gap gets larger. The gap at which the fringes disappear depends on the bandwidth of the optical source, but for typical LEDs in the visible and near infrared, a gap of about 10 to 15 fringes may be enough to significantly wash out the fringe structure in the response.

Typical Fabry-Perot sensors based on using broadband interrogation as a reference use a cavity depth large enough to "wash out" the fringe response. However, in one embodiment of the present device, the sensor may be designed to work with a very small cavity gap, such as less than five fringes in depth. In another embodiment the sensor operates with less than three fringes in depth and in a further embodiment the sensor operates with less than two fringes in depth. In one example the gap on the sensor devices is fabricated wafer-scale by semiconductor processing techniques to accurately control the thickness of the gap in order to accurately control the position on the intensity-cavity depth curve at which the device is operating. The smaller the gap, the less the absolute error in cavity depth and the less uncertainty in position on the intensity versus gap transfer function. This accurate "dead reckoning" of cavity gap may avoid any trimming, or tuning after fabrication, which is highly undesirable.

In one embodiment, the ratio of the output optical intensity from the narrowband signal (producing an intensity $I_1$) and the output optical intensity from the broadband signal (producing an optical intensity $I_2$) of the detector circuit 52 is used to obtain the pressure and eliminate any common-mode signal variations. It should be noted that these common-mode signal variations may occur due to changes in optical signal power variations in the light source or in the optical fiber or in the optical coupler. In another embodiment, optical intensities of the narrowband signal and the broadband signal are subtracted from each other to obtain the pressure and eliminate the common-mode signal variation.

Figure 3:
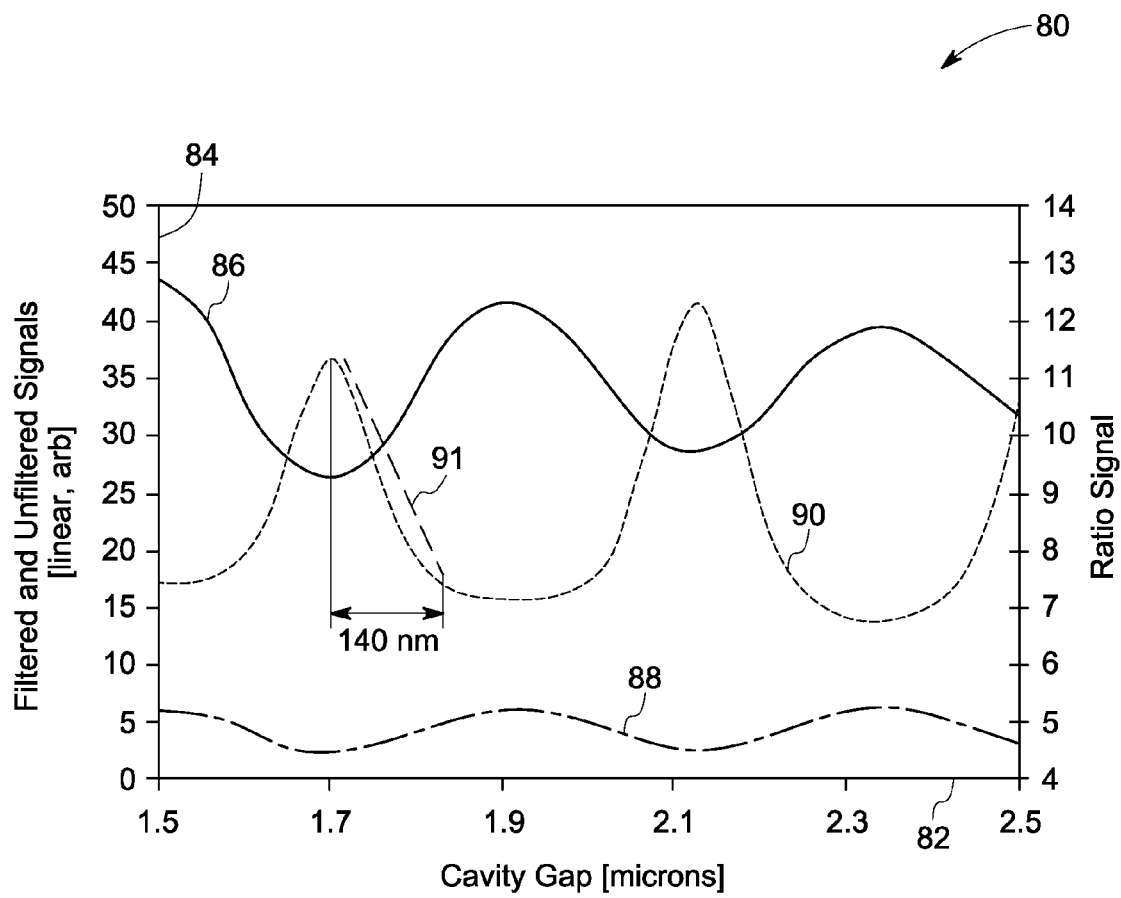
FIG. 3 is a graphical representation of unfiltered, filtered and the ratio of unfiltered to filtered signals.

FIG. 3 is a graphical representation 80 of unfiltered and filtered signals from the FIG. 2 optical detector 60 and 62 respectively and the ratio of the two signals versus the cavity gap in the sensor 42. Horizontal axis 82 represents the cavity gap in microns and vertical axis 84 represents the optical intensity in arbitrary units. The curve 86 is an actual plot of unfiltered broadband light signal 56 of FIG. 2, whereas the curve 88 is a plot of filtered narrowband light signal 58 of FIG. 2. The curve 90 is a plot of the ratio of the two detected signals 86 and 88. In one embodiment, depicted in FIG. 2, at an LED center wavelength of 850 nm, the sensor has cavity gap of 1.8 microns and a 140 nm change in cavity gap or diaphragm deflection results in change in ratio curve 90 by 4 units as represented by an operating slope 91. The ratio curve 90 is calibrated to measure pressure. It can be observed that the broadband signal 86 has not reached the "washed out" condition typically used in this kind of sensor, and this serves to amplify the response of the sensor.

The two signals 56 and 58 from the optical coupler 54 of FIG. 2 are from the same optical source 44 and experience the same transmission path. Thus they have the same variations due to effects such as optical source power fluctuation and fiber loss. The ratio of the outputs from optical detectors 60 and 62 i.e., the ratio of narrowband to broadband is only a function of the Fabry-Perot cavity length, eliminating such common mode sources of error from the final result of the measurement.

Figure 4:
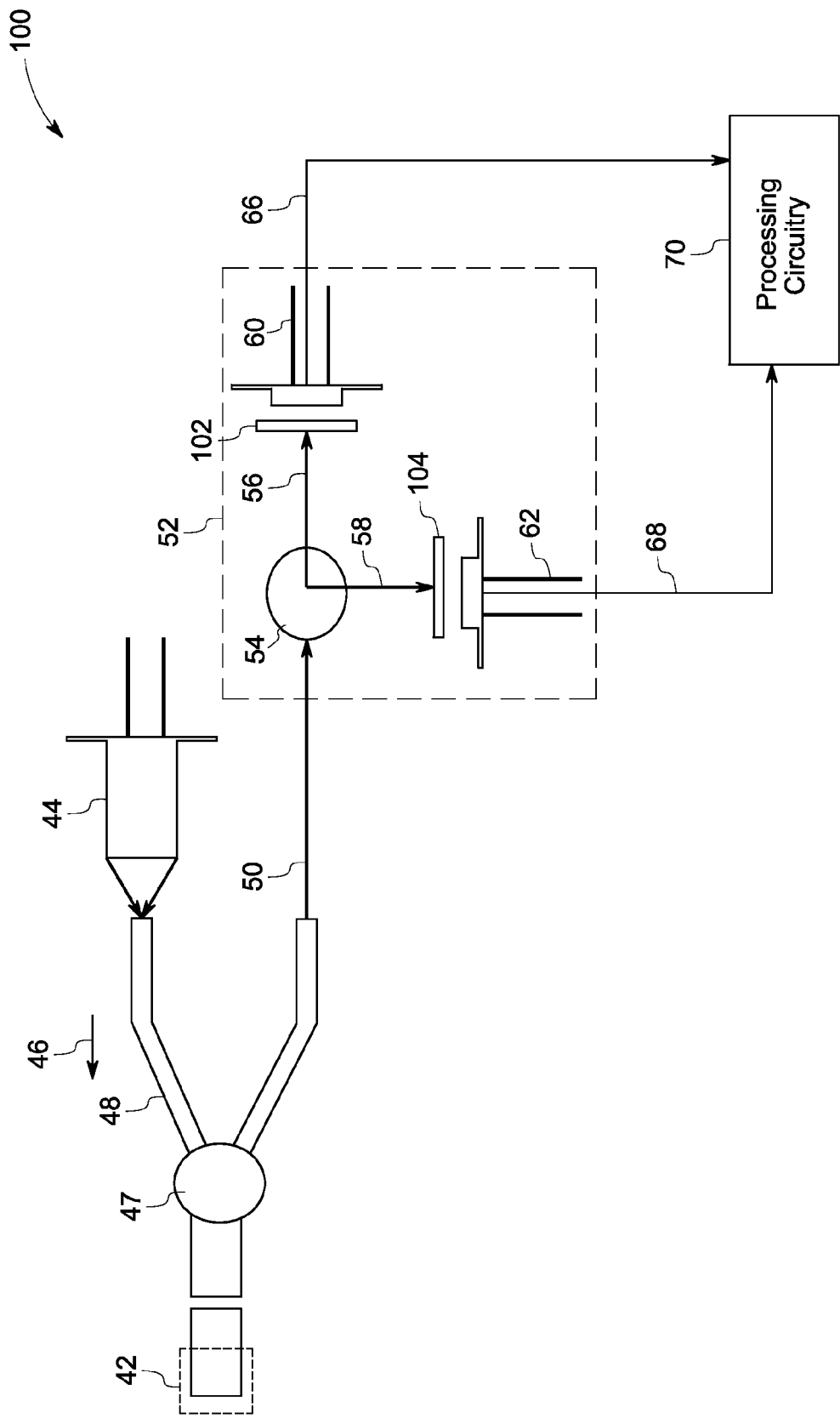
FIG. 4 is a diagrammatical representation of an interrogation system employing two filters, in accordance with an embodiment of the present invention.

FIG. 4 is a diagrammatical representation of another embodiment of an interrogation system 100 employing two filters. The interrogation detector system 100 is similar to the interrogation system 40 of FIG. 2; however, the two split signals 56 and 58 are filtered by filters 102 and 104 before being captured by optical detectors 60 and 62. In one embodiment, the filters 102 and 104 are centered on wavelengths roughly symmetrical on either side of the peak wavelength of the LED. In another embodiment, the filters 102 and 104 are high pass filter and low pass filter respectively.

Figure 5:
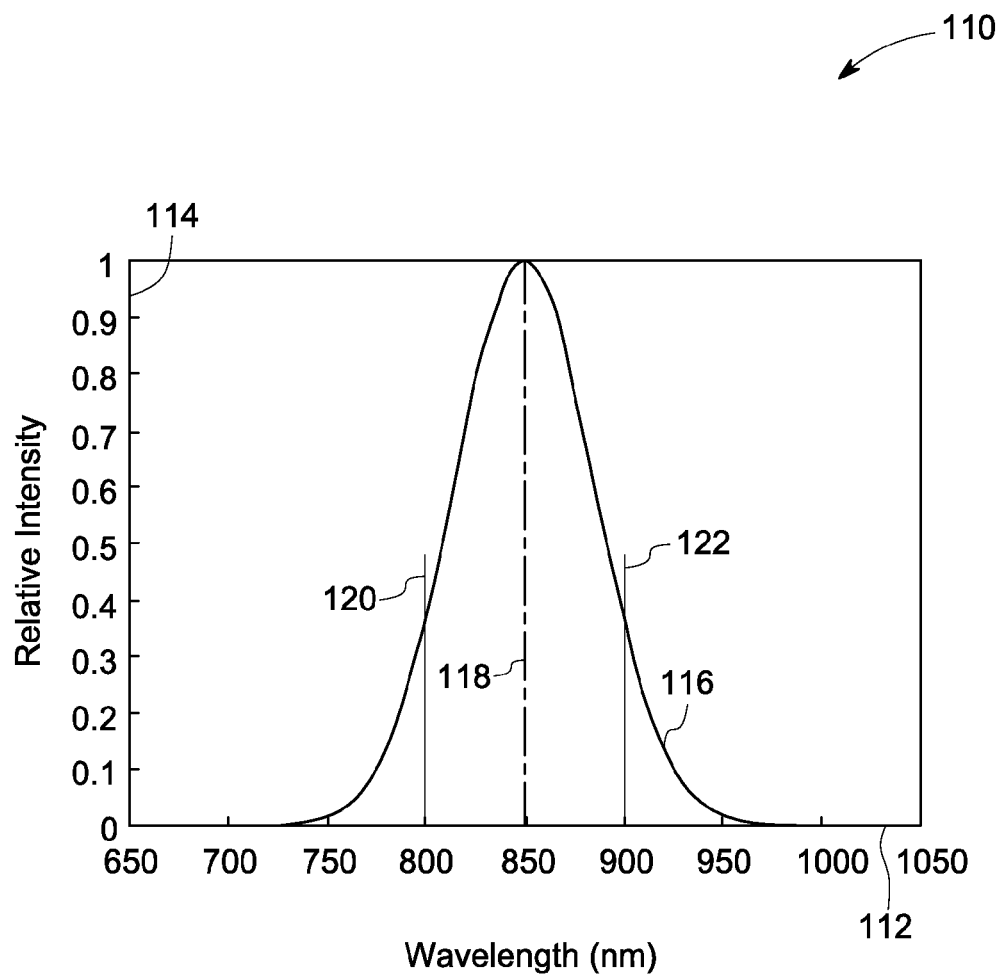
FIG. 5 is a graphical representation of a LED spectrum.

FIG. 5 is a graphical LED spectra representation 110 of a spectrum of LED 44 used in FIG. 4. Horizontal axis 112 represents the wavelength of the LED and vertical axis 114 represents the relative optical intensity of the LED. The curve 116 is a plot of the LED spectrum. In this embodiment, the LED has a central wavelength 850 nm. However, LEDs with other central wavelengths are in the scope of this invention such as 1550 and 1310 nm. As discussed earlier, the two filters 102 and 104 of FIG. 4 are centered on wavelengths of either side of the peak wavelength of the LED. In this embodiment, the peak wavelength or central wavelength is 850 nm shown by reference label 118. Thus, the filter 102 is set at 800 nm shown by reference label 120 and the filter 104 is set at 900 nm shown by reference label 122.

Figure 6:
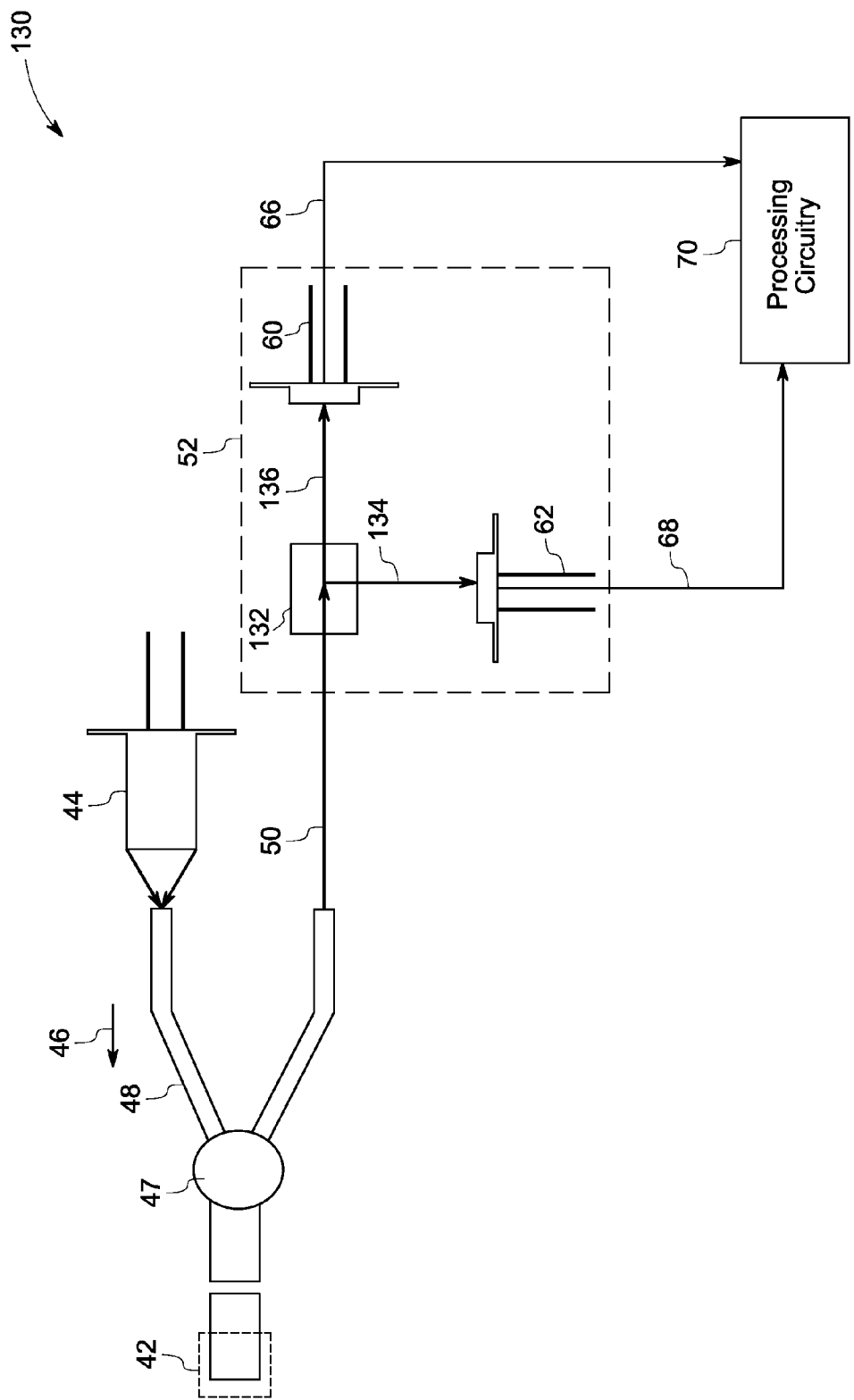
FIG. 6 is a diagrammatical representation of an interrogation system employing a three-port filter, in accordance with an embodiment of the present invention.

FIG. 6 is a diagrammatical representation of an interrogation system 130 employing a three-port filter 132 in accordance with an embodiment of the present system. The interrogation system 130 is similar to the interrogation system 40 of FIG. 2. However, the reflected signal 50 is passed through the three-port filter 132 instead of an optical coupler. The three-port filter 132 combines the splitting and filtering operations shown in earlier embodiments. In one embodiment of the three-port filter, an input port couples the broadband light to a single thin film filter element. The thin film filter element passes the low wavelength energy and reflects the high wavelength energy. The passed and reflected energies are coupled into the two output ports of the filter. In another embodiment, the filter element is a fused fiber wavelength selective coupler, with a broadband input and two separate outputs for the low and high wavelength energies. The three-port filter splits the signal 50 and outputs a low pass filtered signal 134 and a high pass filtered signal 136. The advantage of using three-port filter is it requires fewer components as compared to the configurations of FIG. 2 and FIG. 4. Since there are fewer components, there is less opportunity for loss variations to add noise to the signal and consequently, to the pressure measurement. Another advantage of this configuration is its response over a much larger gap distance is linear compared to the earlier configurations, and it may not require extremely precise fabrication tolerances of the sensor.

Figure 7:
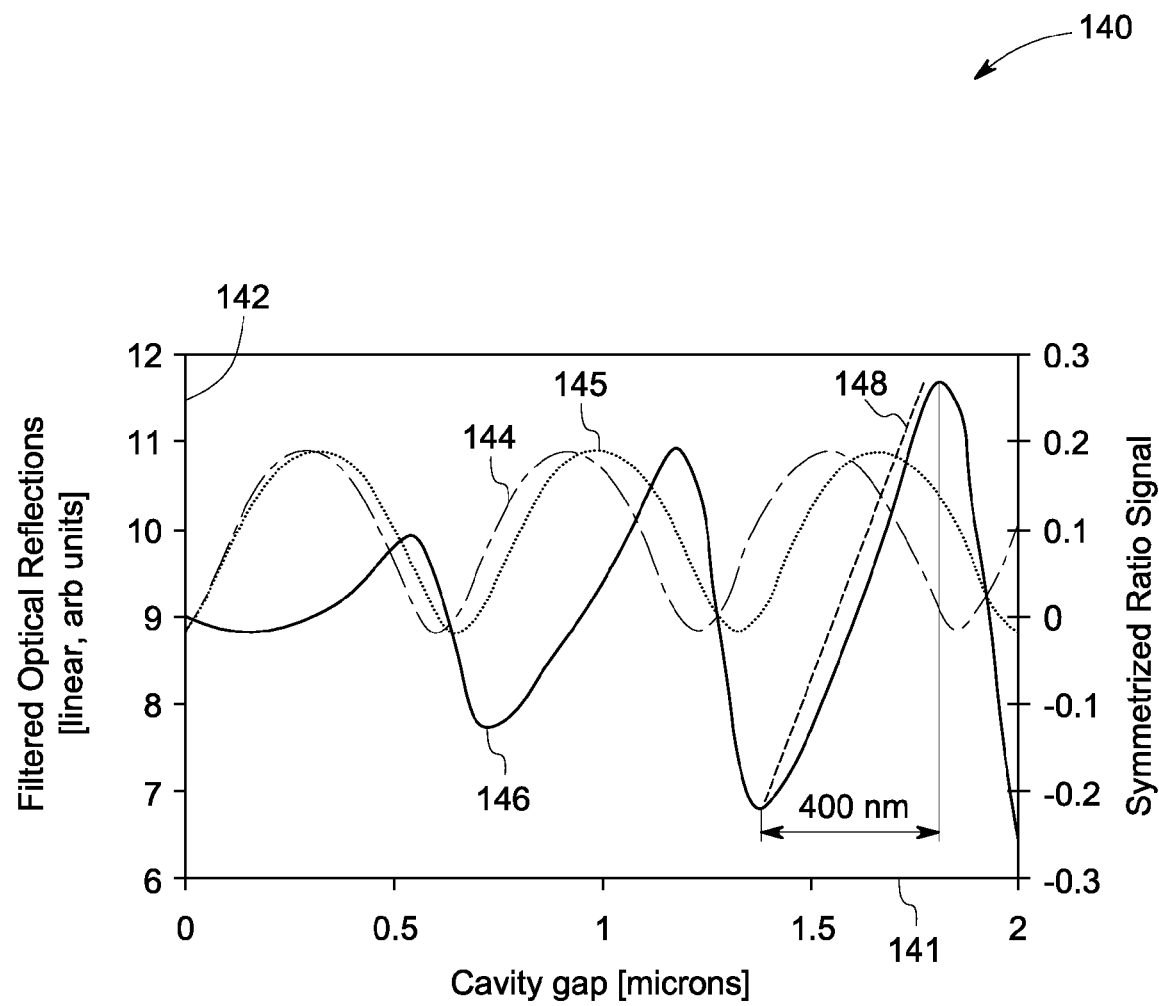
FIG. 7 is a graphical representation of low pass filtered, high pass filtered and the ratio of low pass to high pass filtered signals.

FIG. 7 is a graphical representation 140 of a low pass filtered and a high pass filtered signals from the FIG. 4 optical detector 60 and 62 respectively and the ratio of the two signals versus the cavity gap in the sensor 42. Horizontal axis 141 represents the cavity gap in microns and vertical axis 142 represents the optical intensity in arbitrary units. The curve 144 is a plot of low pass filtered light signal 56 of FIG. 4, whereas the curve 145 is a plot of high pass filtered light signal 58 of FIG. 4. The curve 146 is a plot of ratio of the two detected signals 144 and 145. As can be observed from FIG. 7, compared to the plot of FIG. 3, the operating slope region 148 of this plot is both wider and more linear. This is due to the fact that the operating wavelength has been increased to 1300 nm in FIG. 7 from 800 nm in FIG. 3, and also the fact that the dual-filtered approach in FIG. 7 produces a wider and more linear curve compared to the single filter (or "broadband/narrowband") approach in FIG. 3. In one embodiment depicted in FIG. 7, which is designed to operate around 1300 nm, the sensor has a nominal cavity gap of 1.6 microns, and a 400 nm change in cavity gap or diaphragm deflection results in change in ratio curve 146 by 0.4 units. It will be appreciated by those skilled in the art that by increasing the gap over which the ratio curve remains linear, the tolerance in manufacturing the cavity may be relaxed. For example, assume the required full-scale deflection of the membrane in the application is 90 nm. For the design in FIG. 3 with a center wavelength of 850 nm and a cavity gap of 1.8 microns, the manufacturing tolerance on the cavity depth was about +/−15 nm, assuming the error budget is placed symmetrically on either side of middle of the linear part of the ratio curve. In the design of FIG. 7 with a wavelength of 1300 nm and a cavity gap of 1.6 microns, the fabrication tolerance may be increased to about +/−85 nm, which is a little over a factor of 5 reduction in required fabrication precision.

It should be noted that the wavelength values, the cavity depth values and the fringe values described herein are for illustrative purposes and other wavelength values, cavity depth values and the fringe values are within the scope of the present sensors. In addition, the choice of which fringe to work on is a function of fabrication tolerances, peak to valley depth of the ratio curve and desired signal-to-noise ratio in the detection system. In one embodiment, the second or third fringe typically may turn out to be a favorable in the trade-off analysis. The choice of fringe also doesn't depend too strongly on what method or wavelength of interrogation is chosen, including choices depicted in FIG. 3, FIG. 7 or FIG. 9.

Figure 8:
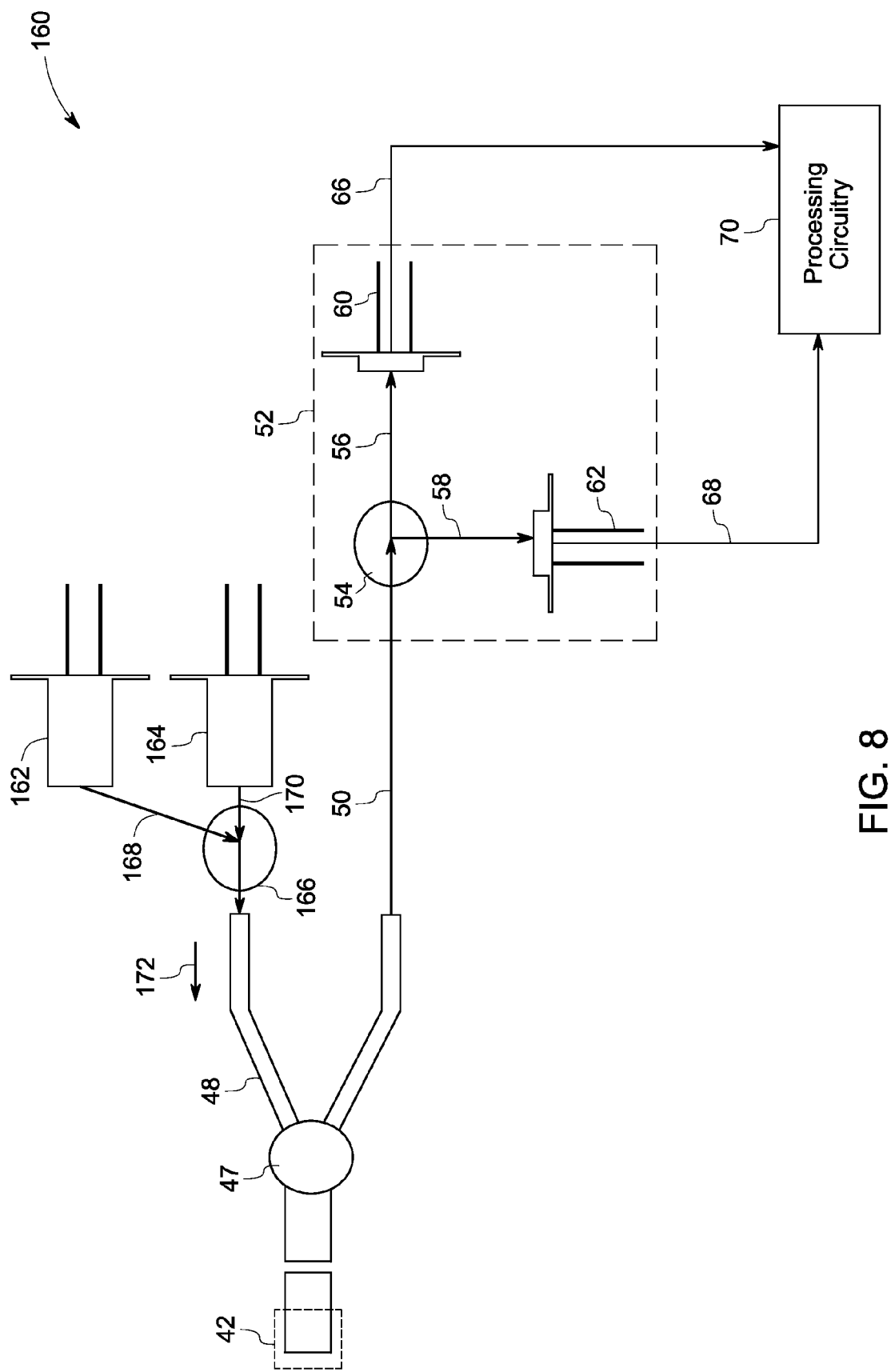
FIG. 8 is a diagrammatical representation of an interrogation system employing two light sources, in accordance with an embodiment of the present invention.

FIG. 8 is a schematic representation of an interrogation detector system 160 employing two light sources in accordance with an embodiment of the present system. The interrogation detector system 160 includes two LEDs 162 and 164 of two different central wavelengths. An optical coupler 166 combines the two light signals 168 and 170 from the two LEDs and transmits a combined or coupled light signal 172 to the sensor 42 through the optical fiber 48. In one embodiment, the LEDs have central wavelengths of 1310 nm and 1550 nm. By using separate optical sources 162, 164, the wavelengths can be chosen to optimize sensitivity to the cavity depth. By using wavelengths spaced wider apart, the sensitivity of the measurement in increased. The system 160 uses lower cost components such as telecom-compatible laser or LED sources and readily available in-line fiber-based WDM couplers made at low cost and in high volume with guaranteed specifications. One advantage of the system 160 is the wide separation in wavelengths allows flexibility in selecting precise source wavelengths.

Figure 9:
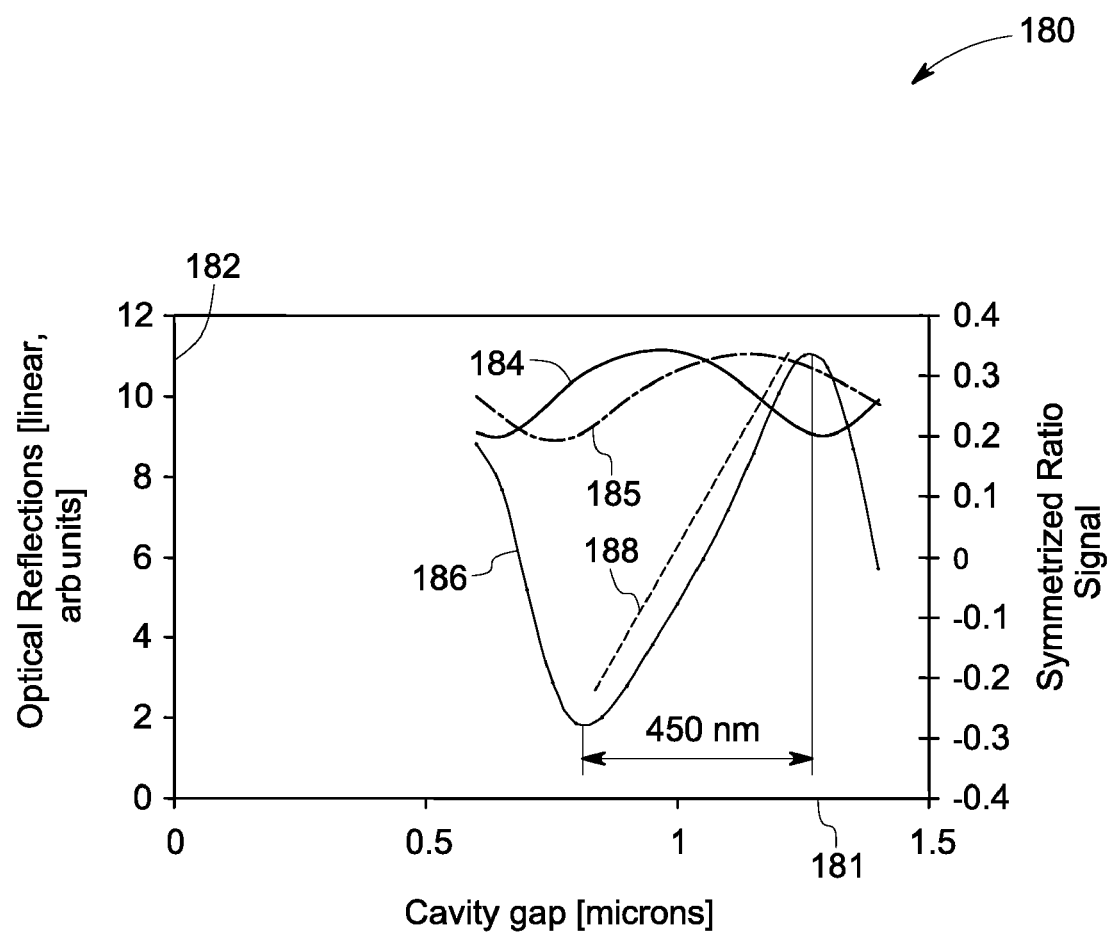
FIG. 9 is a graphical representation of reflections of two light signals and the ratio of the two reflections.

FIG. 9 is a graphical representation 180 of reflections of two light signals 168 and 170 of FIG. 8 and the ratio of the two reflections versus the cavity gap in the sensor 42. Horizontal axis 181 represents the cavity gap in microns and vertical axis 182 represents the optical intensity in arbitrary units. The curve 184 is a plot of the reflection of the light signal 168 of FIG. 8, whereas the curve 185 is a plot of the reflection of the light signal 170 of FIG. 8. The curve 186 is a plot of the ratio of the two reflected signals 184 and 185. As can be observed from FIG. 9, the operating slope region 188 of this plot is similar to the operating slop region 148 of FIG. 7 i.e., more linear and wider. Thus, in this embodiment also the tolerance in manufacturing the cavity can be relaxed. In another embodiment, a closed loop control of the light source may be used to minimize the effect of common mode light variation.

Figure 10:
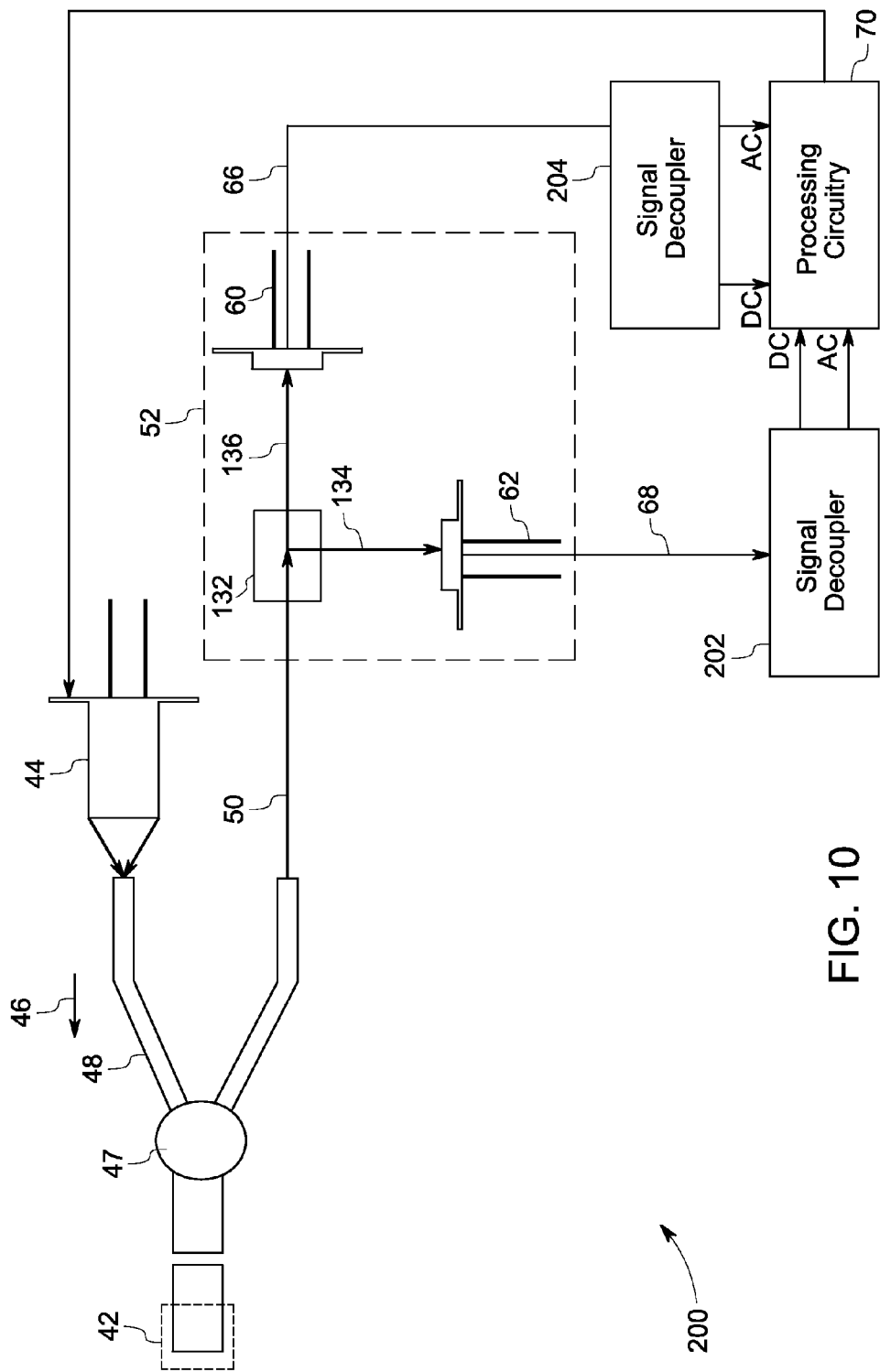
FIG. 10 is a diagrammatical representation of an interrogation system employing light source wavelength control, in accordance with an embodiment of the present invention.

FIG. 10 is a schematic representation of an interrogation detector system 200 employing light source wavelength control, in accordance with an embodiment of the present invention. In one embodiment, if only pressure variations are to be measured (and not the steady state pressure), the steady state light power measured by the two photodiodes 60, 62 may be used to stabilize the wavelength of the light source 44. Source wavelength is typically controlled by modulating source current and/or source temperature, based on a feedback signal from the processing circuitry 70. In the embodiment depicted in FIG. 8, the powers measured by the two photodiodes 60, 62 are each decoupled into AC and DC signals by signal decouplers 202 and 204. The AC signals are used to determine pressure variations as described above. The DC signals are used by the processing circuitry 70 to generate a feedback signal for the light source 44. The processing circuitry generates the feedback signal such that the relative DC energies measured by the two photodiodes 60, 62 are kept constant. By keeping the relative DC energies constant, drifts in the filter cut off wavelength and in the source center wavelength may be fully compensated. Furthermore, this system and processing eliminates the need for a separate wavelength or temperature controller for the source, significantly reducing the complexity of the source electronics. It should be noted that the above source wavelength control scheme may also be employed in the two light source configuration of FIG. 8 to control the wavelength or power of the two light sources 162 and 164.

Figure 11:
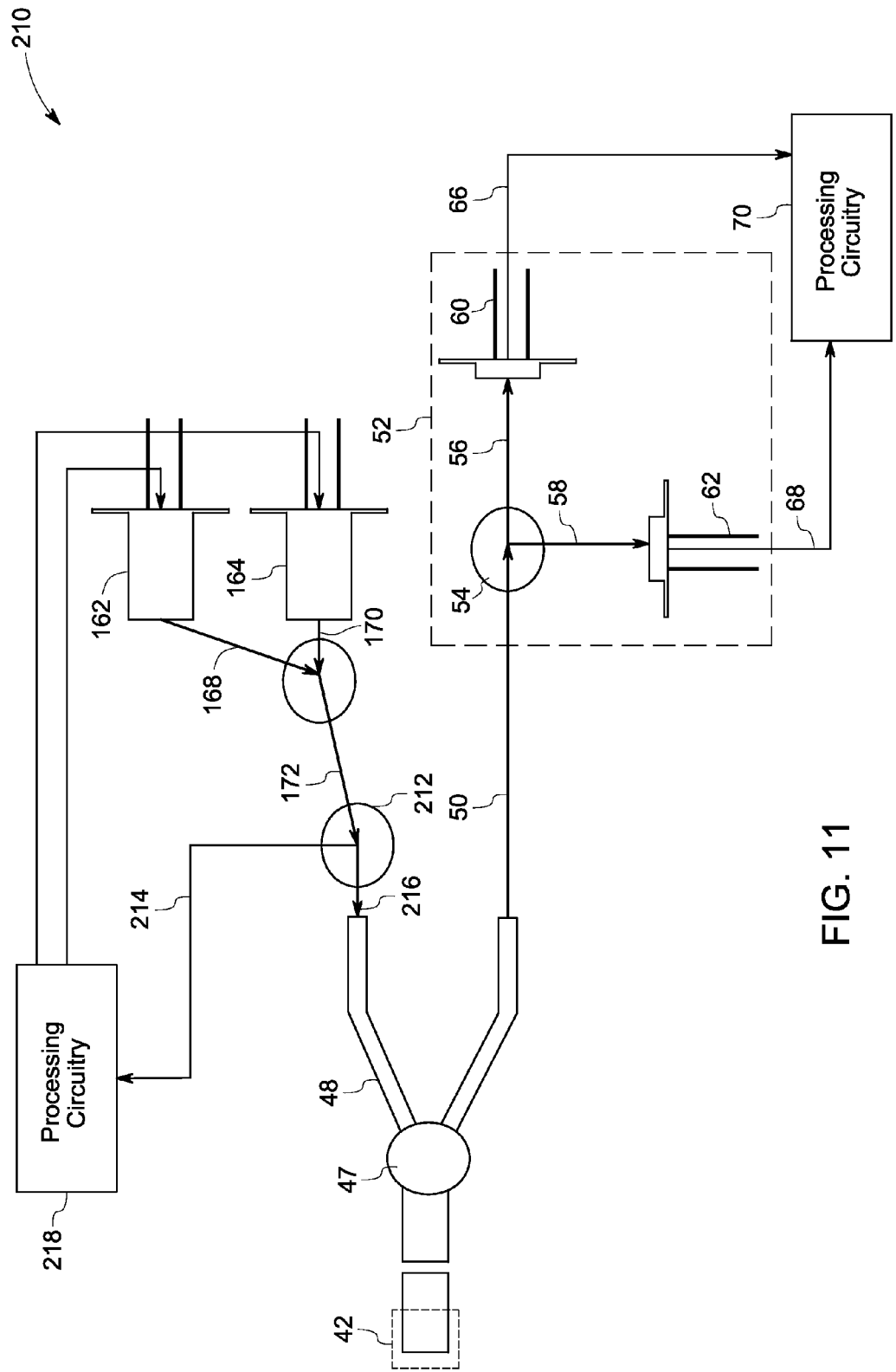
FIG. 11 is a diagrammatical representation of another light source wavelength control system, in accordance with an embodiment of the present invention.

FIG. 11 is a schematic representation of another light source wavelength control system 210, in accordance with an embodiment of the present invention. The system 210 is similar to the system 160 of FIG. 8 employing two light sources. However, in this configuration the output signal 172 of optical coupler 166 is split into two equal signals 216 and 214 by another optical coupler 212. The signal 216 is then transmitted to the sensor 42 as in the configuration of FIG. 8 for pressure measurement. However, the signal 214 is transmitted to processing circuitry 218 as a reference signal and used to stabilize the source wavelengths and/or the source power of the two light sources 162 and 164. This separates the sensing function from the stabilization/control function. In one embodiment, the two processing circuitries 218 and 70 may be combined into one processing circuitry. It will be appreciated by those skilled in the art that a similar scheme may be used in case of a single light source configurations of FIGS. 2, 4 and 6. However, in those configuration the optical coupler 166 may not be necessary. It should be noted that similar other schemes of controlling wavelength or power of the light sources are in scope of the present interrogation system.

Figure 12:
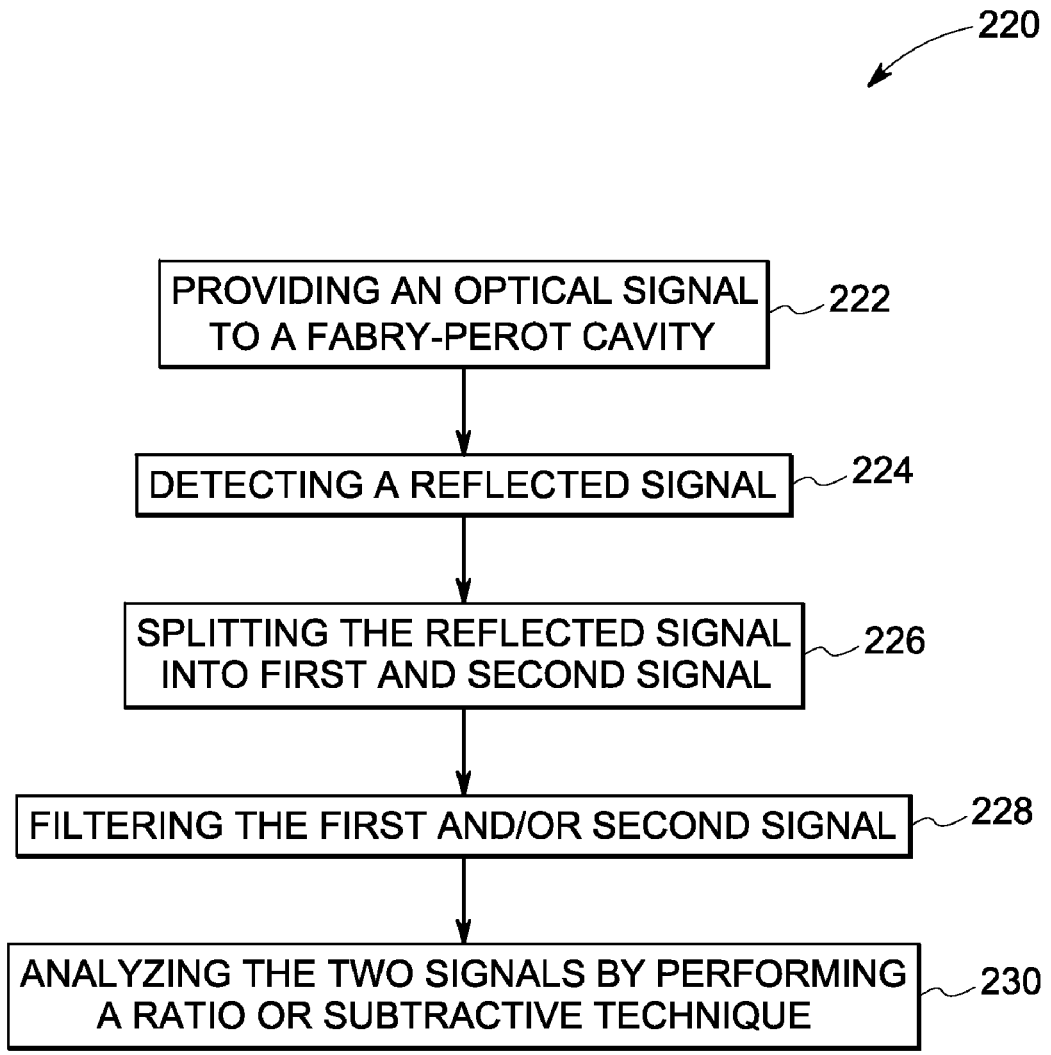
FIG. 12 is a flowchart representing steps of interrogating a pressure sensor, in accordance with an embodiment of the present invention.

FIG. 12 is a flowchart 220 representing steps of interrogating a pressure sensor. A single, or multiple optical signals are provided to a Fabry-Perot cavity gap of the pressure sensor in step 222. In one embodiment, the optical signals may be provided by a light source such as a LED and transmitted to the cavity gap through fiber optics. A reflected signal from the cavity gap is received by an optical coupler in step 224. The cavity gap in the pressure sensor is formed by a diaphragm made of a quartz substrate. The diaphragm responds to an applied pressure resulting in changes to the cavity gap distance. The reflected signal from the cavity gap changes according to the change in cavity gap distance. The optical coupler splits the reflected signal into two parts namely, a first signal and a second signal in step 226. In step 228, the signals may be optionally filtered. The resultant signals are then analyzed to determine the deflection in the Fabry-Perot cavity and hence the pressure 230. In one embodiment, the pressure is determined by taking ratio of light intensities of the two signals. In another embodiment, the pressure is determined by subtracting the intensities of the two signals.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical pressure sensor interrogation system, comprising:
    a light source for providing an optical signal to an optical pressure sensor;
    an optical coupler for receiving a reflected signal from the optical pressure sensor, splitting the reflected signal and providing a first portion of the reflected signal to a high pass filter and a second portion of the reflected signal to a low pass filter;
    a first optical detector for receiving a first filtered signal from the high pass filter;
    a second optical detector for receiving a second filtered signal from the low pass filter; and a processing circuitry configured to obtain pressure based on a relationship between light intensities of the first and the second optical detector output signals, wherein the processing circuitry is further configured to provide a feedback signal to the light source to control a wavelength of the optical signal based on a reference optical signal.

2. The system of claim 1, wherein the relationship between light intensities of the first optical detector and the second optical detector comprises division.

3. The system of claim 1, wherein the relationship between light intensities of the first optical detector and the second optical detector comprises subtraction.

4. The system of claim 1, wherein the high pass and the low pass filters are set at a frequency centered on either side of a peak wavelength of the light source.

5. The system of claim 1, wherein the reference optical signal is generated by splitting the optical signal.

6. The system of claim 1, wherein the peak wavelength of the light source is 1550 nm.

7. The system of claim 1, wherein the light source comprises a light emitting diode (LED) or a laser diode.

8. The system of claim 1, wherein the first optical detector and the second optical detector comprises a semiconductor photodiode.

9. The system of claim 1, wherein the optical pressure sensor comprises Fabry-Perot interferometer.

10. The system of claim 1, wherein the optical pressure sensor is configured to work with a small cavity gap of less than about a third fringe.

11. An optical pressure sensor interrogation system, comprising:
    a light source for providing an optical signal to an optical pressure sensor;
    a three port filter for receiving a reflected signal from the optical pressure sensor, splitting and filtering the reflected signal and providing a low-pass filtered signal of the reflected signal to a first optical detector; a second optical detector to receive a high-pass filtered signal of the reflected signal from the three port filter; and
    a processing circuitry configured to obtain pressure based on a relationship between light intensities of the first and the second optical detector output signals, wherein the processing circuitry is further configured to provide a feedback signal to the light source to control a wavelength of the optical signal based on a reference optical signal.

12. The system of claim 11, wherein the relationship between light intensities of the first optical detector and the second optical detector comprises division.

13. The system of claim 11, wherein the relationship between light intensities of the first optical detector and the second optical detector comprises subtraction.

14. An optical pressure sensor interrogation system, comprising:
    a first light source and a second light source for providing a first optical signal and a second optical signal; a first optical coupler for receiving the first optical signal and the second optical signal and providing a coupled signal to the optical pressure sensor;
    a second optical coupler for receiving a reflected signal from the optical pressure sensor, splitting the reflected signal and providing a first portion of the reflected signal to a first optical detector and a second portion of the reflected signal to a second optical detector; and a processing circuitry configured to obtain pressure based on a relationship between light intensities of the first and the second optical detector output signals, wherein the processing circuitry is further configured to provide a feedback signal to the first and the second light sources to control a wavelength of the first and the second optical signals, wherein the processing circuitry is configured to provide a feedback signal based on a reference optical signal.

15. The system of claim 14, wherein the reference optical signal is generated by splitting the coupled signal.

16. The system of claim 14, wherein the relationship between light intensities of the first optical detector and the second optical detector comprises division.

17. The system of claim 14, wherein the relationship between light intensities of the first optical detector and the second optical detector comprises subtraction.

18. The system of claim 14, wherein the first light source has a central wavelength of 1310 nm.

19. The system of claim 14, wherein the second light source has a central wavelength of 1550 nm.

* * * * *